E. S. HUTTON.
GLASS DISCHARGING MECHANISM.
APPLICATION FILED JULY 6, 1920.
1,394,677.
Patented Oct. 25, 1921.
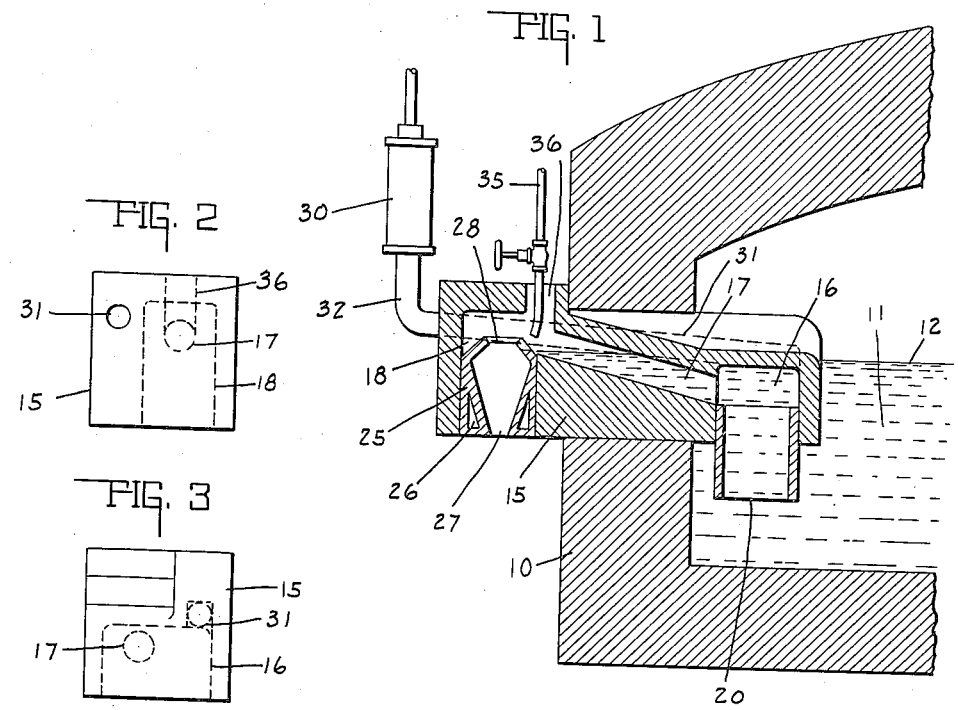
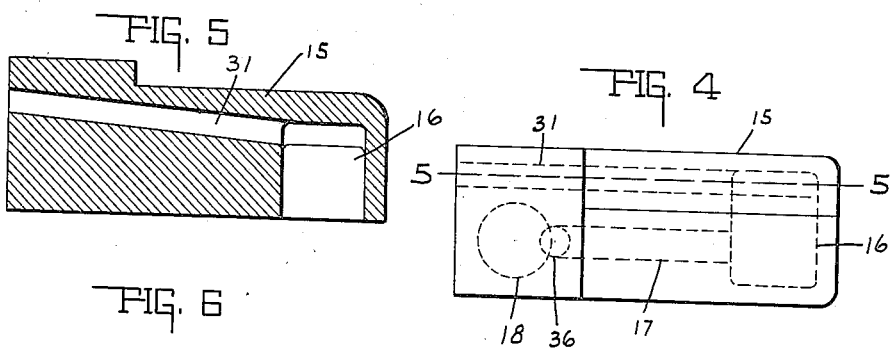
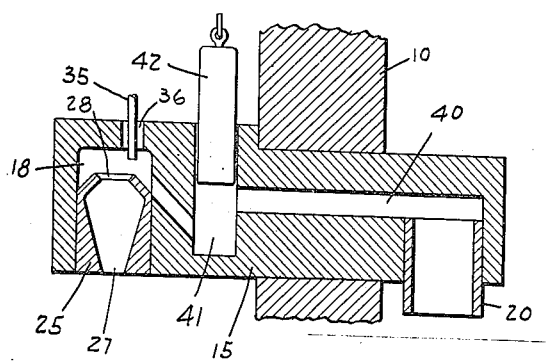
EDWARD S. HUTTON.
INVENTOR.
BY
ATTORNEYS.

UNITED STATES PATENT OFFICE.

EDWARD S. HUTTON, OF LAPEL, INDIANA.

GLASS-DISCHARGING MECHANISM.

1,394,677. Specification of Letters Patent. Patented Oct. 25, 1921.

Application filed July 6, 1920. Serial No. 394,241.

*To all whom it may concern:*

Be it known that I, EDWARD S. HUTTON, a citizen of the United States, and a resident of Lapel, county of Madison, and State of Indiana, have invented a certain new and useful Glass-Discharging Mechanism; and I do hereby declare that the following is a full, clear, and exact description thereof, reference being had to the accompanying drawings, in which like numerals refer to like parts.

The object of this invention is to improve the construction and operation of discharging apparatus for glass tanks substantially as shown in my application Serial No. 368,867, filed March 26, 1920. The improvements relate chiefly to the removal inlet and discharge bushings formed and arranged substantially as set forth herein. The character of said improvements will be understood from the accompanying drawings and the following description and claims.

In the drawings Figure 1 is a vertical section of a portion of a glass tank and a central vertical section of the discharging apparatus embodying my invention. Fig. 2 is an elevation of the outer end of the discharge apparatus with the air supplying means omitted and parts being shown by dotted lines. Fig. 3 is an elevation of the rear end of the discharge apparatus with the inlet bushing omitted, parts being shown by dotted lines. Fig. 4 is a plan view of the block or discharge apparatus with associated parts omitted and the chambers and passageways therein being indicated by dotted lines. Fig. 5 is a longitudinal section thereof on the line 5—5 of Fig. 4. Fig. 6 is a longitudinal section through a modified form of the discharge apparatus.

There is shown in the drawings a glass tank 10 which may be of any construction and adapted to hold molten glass 11, the level of the upper surface of which is indicated by the dotted line 12. The discharge member 15, as herein shown, is substantially a rectangular block of clay or like incombustible material which is inserted through the wall of the tank in a horizontal position so that the upper portion thereof will be above the normal glass level and the lower portion below that level. Each end of the member 15 projects several inches beyond the wall.

The discharge member 15 has a glass receiving chamber 16 in its inner end and open at the bottom of the member so that the glass will enter said chamber and stand therein as high as in the tank. A glass conduit 17 extends from the upper part of the chamber 16 outward at an upward inclination to the discharge chamber 18 in the outer end of the member 15. Said discharge chamber 18 extends to the bottom of the block or member 15, and it is open on the under side to permit the discharge of glass downward therefrom to a mold, not shown, situated below to receive the gather of glass. The glass normally stands in said discharge apparatus and tank so that the level thereof will be at or immediately below the lower portion of the discharge end of the glass conduit 17.

The receiving chamber 16 is relatively large, as indicated in Figs. 1 and 4, and is adapted to receive and have wedged into it an inlet bushing 20 of the desired size and shape. This bushing is thus enabled to extend downward into the body of the mass of glass in the tank so as to receive the glass in its best condition so that there will be no danger of the glass which enters the discharge apparatus coming near the top of the glass or over any portion of the glass which is not at the highest heat. The length of the bushing 20, therefore, may be made such as desired, and by having a plurality of bushings of different lengths, one will have a choice so that he can arrange this part of the mechanism to suit the conditions of the glass and work. Likewise the passageway through the bushing 20 may be contracted to the extent desired by having a supply of bushings with orifices therethrough of different sizes.

In the chamber 18 at the outer end of the device a removable discharge bushing 25 is employed. This bushing is preferably constructed so as to have an air or cooling chamber 26 in the wall thereof and particularly near the discharge orifice at 27. The inlet opening at the upper end of said bushing is larger than the discharge orifice and has a trough-like groove 128 that leads from the outlet end of the glass conduit 17. This inlet opening 28 may be grooved or formed so as to suit the quality of glass and the amout of gather or discharge and the shape of the discharge.

The workman will provide a number of discharge bushings 25 with the outlet orifices and the inlet orifices varying in size and shape so that he can readily insert any one of them as he may desire to suit the work being done.

In operation the glass may be assumed to stand in the discharge mechanism in the same level as in the tank. A discharge or gather of glass is suddenly forced upward from the outer end of the discharge conduit 17 into the discharge bushing 25. This, in the mechanism shown in the first four figures, is effected by compressed air coming from the compressed air apparatus 30 and passing therefrom through the air conduit 31 to the upper part of the receiving chamber 16. The air compressor 30 is connected by a pipe 32 with said air conduit 31. A slight operation of the air compressor will force pressure into the upper part of the chamber 16 so that it will act on the surface of the glass therein and force it up through the glass conduit 17 and cause a sudden and limited discharge of glass from the outlet end of the conduit 17 into the discharge bushing 25. The quantity of glass discharged at any one time can be controlled within practical limits by controlling or regulating each operation of the air compressing means.

A gas pipe 35 enters an opening 36 in the top of the discharge member 15 so as to discharge in the proximity of the outer end of the glass conduit 17 and the upper end of the bushing 25 to direct a flame against the glass at that point so that there will be no tendency thereof to chill and linger or adhere to the parts, the glass will continue liquefied so it will readily flow.

In the modified form shown in Fig. 6 there is a glass conduit 40 in place of the glass conduit 17 which discharges into a vertical well or chamber 41 in which a plunger 42 is vertically operable. Said plunger is substantially of the same size in cross section as the chamber 41, and the outlet end of the conduit 40 is above the lower end of the chamber 41 so that the plunger will cut off the glass and close the outlet end of the chamber 40 and will force the glass from the lower part of the chamber 41 up through the glass conduit 43 through the discharge chamber 18 into the discharge bushing 25.

Thus there is shown in Figs. 1 and 6 alternative means for closing the discharge of each gather of glass and either of these means may be used so far as the improvements herein are concerned.

The invention claimed is:

1. The combination of a glass tank, a glass discharge member extending through the wall thereof with its ends projecting beyond said wall, said member having a relatively large glass receiving chamber opening downward in the inner portion thereof and a glass conduit of relatively smaller dimensions in cross section than said receiving chamber and which extends from the upper end of said receiving chamber at an upward inclination to the discharge end thereof, and means for causing a sudden rising of the glass in the outer portion of said conduit for causing the discharge therefrom of a gather of glass.

2. The combination with a glass tank, and a glass discharge member extending through the wall thereof with its ends projecting beyond said wall, said member having a relatively large glass receiving chamber opening downward in the inner portion thereof and a glass conduit of relatively smaller dimensions in cross section than said receiving chamber and which extends from the upper end of said receiving chamber at an upward inclination to the discharge end thereof, means for causing a sudden rising of the glass in the outer portion of said conduit for causing the discharge therefrom of a gather of glass, and a tubular removable bushing vertically insertible in said receiving chamber and extending downward below the bottom of said discharge member.

3. The combination of a glass tank, a glass discharge member extending through the wall thereof with its ends projecting beyond said wall, said member having a longitudinally and upwardly inclined glass conduit leading from the lower and inner part of said member, and an enlarged vertically disposed discharge chamber in the outer end of said member open at the bottom and connected at its upper end with said glass conduit, means for causing the discharge of glass from said conduit, and a discharge bushing removably secured in said chamber with an opening in its upper end in position to receive the glass discharged from said glass conduit.

4. The combination of a glass tank, a glass discharge member extending through the wall thereof with the ends projecting beyond said wall, said member having a longitudinally and upwardly inclined glass conduit leading from the lower and inner part of said member and an enlarged vertically disposed discharge chamber in the outer end of said member open at the bottom and connected at its upper end with said glass conduit, means for causing the discharge of glass from said conduit, and a discharge bushing removably secured in said chamber, with an inlet opening in its upper end in position to receive the glass discharged from said glass conduit and having a trough-like groove in the side thereof leading from the outer end of said glass inlet to guide the glass thereto.

5. The combination of a glass tank, a glass discharge member extending through the wall thereof with its ends projecting beyond said wall, said member having a longitudinally and upwardly inclined glass conduit leading from the lower and inner part of said member and an enlarged vertically disposed discharge chamber in the outer end of said member open at the bottom and connected at its upper end with said glass conduit, means for causing the discharge of glass from said conduit, and a discharge bushing removably secured in said chamber with an opening in its upper end in position to receive the glass discharged from said glass conduit, the lower outlet opening in said bushing being smaller than said opening in the upper end thereof and there being a cooling chamber in the bushing surrounding said outlet opening.

6. The combination of a glass tank, a glass discharge member extending through the wall thereof with its ends projecting beyond said wall, said member having a longitudinally and upwardly inclined glass conduit leading from the lower and inner part of said member and an enlarged vertically disposed discharge chamber in the outer end of said member open at the bottom and connected at its upper end with said glass conduit, means for causing the discharge of glass from said conduit, a discharge bushing removably secured in said chamber and with an opening in its upper end in a position to receive the glass as discharged from said glass conduit, and means for directing a flame against the upper end of said bushing near the discharge end of said glass conduit.

In witness whereof, I have hereunto affixed my signature.

EDWARD S. HUTTON.